United States Patent [19]
Miotto

[11] Patent Number: 6,138,787
[45] Date of Patent: Oct. 31, 2000

[54] MOTOR-DRIVEN SYSTEM FOR STEERING A VEHICLE

[76] Inventor: Francesco Miotto, Villaggio S. Antonio, 59 Thiene (Vicenza), Italy

[21] Appl. No.: 08/860,807

[22] PCT Filed: Dec. 14, 1995

[86] PCT No.: PCT/IT95/00220

§ 371 Date: Jul. 9, 1997

§ 102(e) Date: Jul. 9, 1997

[87] PCT Pub. No.: WO96/22908

PCT Pub. Date: Aug. 1, 1996

[30] Foreign Application Priority Data

Jan. 23, 1995 [IT] Italy ................................ VI950010

[51] Int. Cl.$^7$ ........................................... B62D 5/30
[52] U.S. Cl. ...................... 180/405; 180/446; 280/771
[58] Field of Search .................... 180/402, 405, 180/407, 421, 422, 423, 443, 444, 446; 280/771

[56] References Cited

U.S. PATENT DOCUMENTS

| | | | |
|---|---|---|---|
| 3,866,706 | 2/1975 | Lincke et al. | 180/79.2 R |
| 4,556,116 | 12/1985 | O'Neil | 180/444 |
| 4,574,903 | 3/1986 | Hashimoto et al. | 180/446 |
| 4,582,155 | 4/1986 | Ohe | 180/79.1 |
| 5,027,648 | 7/1991 | Filleau | 73/118.1 |
| 5,050,697 | 9/1991 | Umemura | 180/79.1 |
| 5,159,553 | 10/1992 | Karnopp et al. | 180/402 |
| 5,239,490 | 8/1993 | Masaki et al. | 180/79.1 |
| 5,267,625 | 12/1993 | Shimizu | 180/443 |
| 5,275,250 | 1/1994 | Muller et al. | 180/402 |
| 5,284,219 | 2/1994 | Shimizu et al. | 180/444 |
| 5,423,391 | 6/1995 | Shimizu | 180/446 |
| 5,511,629 | 4/1996 | Vogel | 180/79.3 |
| 5,762,162 | 6/1998 | Bodtker | 180/444 |

FOREIGN PATENT DOCUMENTS

| | | |
|---|---|---|
| 0 447 626 A2 | 9/1991 | European Pat. Off. |
| 2 202 501 | 9/1988 | United Kingdom. |
| 2 275 032 | 8/1994 | United Kingdom. |

*Primary Examiner*—Kevin Hurley
*Attorney, Agent, or Firm*—Akin, Gump, Strauss, Hauer & Feld, L.L.P.

[57] ABSTRACT

A motor driven system for steering a vehicle is provided, the system including a steering control device and a steering device connected through a motorized device, the motorized device transmitting movement to the steering device, the movement having an amplitude different from the movement given to the control device by the driver. The change in amplitude is controlled by a control unit according to various parameters. In this way, the degree of movement of the steering control device is changed by the motorized device such that operators having diminished physical capacity are able to operate the steering control.

10 Claims, 3 Drawing Sheets

MOTOR-DRIVEN SYSTEM FOR STEERING A VEHICLE

BACKGROUND OF THE INVENTION

The present invention relates to a motor-driven system for steering a vehicle, characterized in that the steering control device (e.g. steering-wheel) and the steering device (e.g. steering-box) are connected through a motorized device suitable to transmit to the steering device a movement having an amplitude different from the movement given to the steering control device by the pilot, said change of amplitude being variable according to various parameters.

When the vehicle is steered through the control device and the motorized device is operating, said motorized device can amplify the movement transmitted to the steering device with respect to the movement given to the steering control device by the pilot. In this case, the work of the pilot, which gives on said control device a reaction comparable with the action he would have given in the absence of the motorized device, is smaller than that which would have been otherwise required, and the steering is facilitated, in particular in small radius manouvres.

Moreover, the motorized device, when properly controlled, can even reduce the amplitude of the movement transmitted to the steering device with respect to the movement given to the steering control device by the pilot, thus reducing the effect on the steering device of the pilot's action.

The applicant, on the basis of his knowledge of the state of the art, believes that no devices have been on sale, or subject-matter of patent applications, which achieve the advantages of the subject-matter of the present invention.

A number of devices, even electrical ones, suitable to reduce the steering work, known as power steerings, are characterized in that the steering movement given by the pilot remains unchanged between the inlet and the outlet, while the force or torque which the pilot applies on the control device is amplified. To this purpose, in all known power steerings the steering action is increased by means of an actuator located between the vehicle frame and the steering device, regardless of the fact that the actuator is of the electrical or hydraulic type or other types. Electrical power steerings of this type have been patented, among the others, by the companies ADWEST ENGINEERING LTD. (WO 9212037, etc.), ALFRED TEVES GMBH (WO 9214640, WO 9212885, etc.), DR. ING. H.C.F. PORSCHE AG (EP 0447626, etc.), HONDA GIKEN KOGYO KABUSHIKI KAISHA (EP 0590576, etc.), KOSHIO SEIKO CO. (EP 0611691, EP 0350817, EP 0460406, EP 0572961, EP 0566168, EP 0556869, EP 0556870, EP 0554703, EP 0531870, EP 0536590, EP 0535422, EP 0611691, EP 0599260, etc.), LUCAS INDUSTRIES (EP 0403234, etc.), MAN NUTZFAHRZEUGE AG (EP 0580997, etc.), MITSUBISHI DENKI KABUSHIKI KAISHA (EP 0360469, EP 0360470, EP 0351087, EP 0361726, EP 0513941, EP 0567991, etc.), MITSUBISHI JIDOSHA KOGYO KABUSHIKI KAISHA (EP 0440365, etc.), NIPPONDENSO CO. (EP 0460582, etc.), REGIE NATIONAL DES USINE RENAULT S.A. (EP 0478437, etc.), ROBERT BOSCH GMBH (EP 0480159, EP 0501017, EP 0545034, EP 0525574, etc.), SEXTANT AVIONIQUE (EP 0522924, etc.), STEERING DEVELOPMENT LTD. (EP 0165758), TEXAS INSTRUMENTS INCORPORATED (EP 0481568, etc.), THE RAYMOND CO. (EP 0490673, EP 0596167, etc.), TOYOTA JIDOSHA KABUSHIKI KAISHA (EP 0531962, etc.), VALEO ELECTRONIQUE (EP 0461037, etc.), VALEO SYSTEMES D'ESSUYAGE (EP 0491601, etc.), VOLKSWAGEN AG (EP 0591653, etc.), ZF FRIEDRICHSHAFEN AG (WO 9314966, WO 9312965, etc.).

On the contrary, in the system of the present invention the pilot's steering work is reduced not by amplifying the force applied along the rotation but conversely by amplifying the angle of rotation along which the force must be applied. To this purpose, the steering column is not continuous, i.e. the connection between the control device and the steering device is not direct as in any known steering system, be it powered or not. The interposition of the motorized device between the control device and the steering device makes possible the amplification or reduction of the rotation, thus achieving a steering angle different from the angle normally produced by the gearing-down built in the steering system. However, it is possible to apply the present steering system in series with a known power steering, thus combining the advantages of both apparatuses.

GB-A-2275032 discloses a control appliance for a vehicle steering system wherein the steering column is divided into an input shaft and an output shaft with a motorized drive therebetween, in the form of a self-locking electric motor. However, this system is an automatic steering control system aimed at satisfying the highest safety requirements while avoiding as far as possible the irritation of the driver caused by its automatic intervention on the front steered wheels, said intervention being intended to compensate for particular driving conditions (e.g. side wind) detected by relevant sensors. Such a kind of operation implies that the system acts only when the input signals from the sensors indicate that an automatic intervention is required, while trying to minimize the effect of the correction on the steering wheel. This is quite the opposite of the operation of the present system, whose activation can only be determined by the input coming from the driver through the movement of the steering wheel. Therefore, it is clear that such an automatic control system is not designed to help the driver in his steering action but rather to provide an autonomous steering action possibly superimposed on the driver's one.

BRIEF SUMMARY OF THE INVENTION

An object of the present invention is to help the pilot during the steering of a vehicle by modifying properly the amplitude of the movement transmitted to the steering device with respect to the movement given to the control device.

Another object of the present invention is to control the action of the pilot on the steering device so as to prevent undesirable manouvres.

Another object of the present invention is to make easily the steering control remote.

Another object of the present invention is to achieve all of the above with a reliability of the steering system which, in case of failure of the motorized device and of the control unit thereof, is equal to the reliability of a mechanical system.

Another object of the present invention is to achieve all of the above on an existing vehicle provided with a conventional steering system, with minor changes to the structure and arrangement of the original steering devices.

Another object of the present invention is to achieve all of the above at a very low cost.

Thanks to the action of the motorized device, the pilot can achieve the steering with an effort comparable to the effort he would have made in the absence of said device, but with a lower amplitude of the movement of the control device. This allows to achieve the steering through control devices characterized by very small global movements, such as for example devices in the form of a cloche, a handlebar or a joystick, yet retaining a precision in the steering control comparable with the precision of conventional highly geared-down steering devices.

Therefore, the subject-matter of the present invention is particularly useful in all those steering manouvres which require large movements of the control device, such as the rotations of the steering-wheel during parking manouvres or on tortuous roads. Furthermore, the subject-matter of the present invention is particularly useful for the purpose of allowing the steering with conventional steering-wheels or helms to people with little functional capacity of the upper limbs, such as, for example, people affected by some myopathies, or without the use of one arm. In fact, these people may have sufficient strength in the hands and wrists to hold the steering-wheel, but not enough strength in the shoulders to move the arms enough for rotating the steering-wheel beyond a small arc of rotation.

Also, the possibility of properly changing the amplitude of the movement transmitted by the control device to the steering device, while allowing in some situations the amplification of the pilot's action, in the same way it allows in other situations to have a direct transmission or the reduction of the effect of the pilot's action.

In order to assure the reliability of the steering system even in case of failure of the motorized device, it is sufficient to use an irreversible motorized device or to provide a simple locking device suitable to make mutually integral the two parts of the motorized device respectively coupled to the control device and the steering device.

BRIEF DESCRIPTION OF THE SEVERAL VIEWS OF THE DRAWINGS

These and other objects, advantages and characteristics of the steering system according to the present invention will be apparent to those skilled in the art from the following detailed description of some preferred embodiments thereof, reported as non-limiting examples, referring to the annexed drawings wherein.

DETAILED DESCRIPTION OF THE INVENTION

Figure 1:
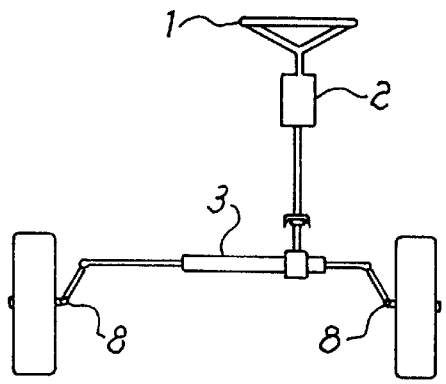
FIG. 1 schematically shows a first embodiment wherein the motorized device is placed between the steering control device, in the form of a steering-wheel, and the steering device, in the form of a steering-box.
Figure 7:
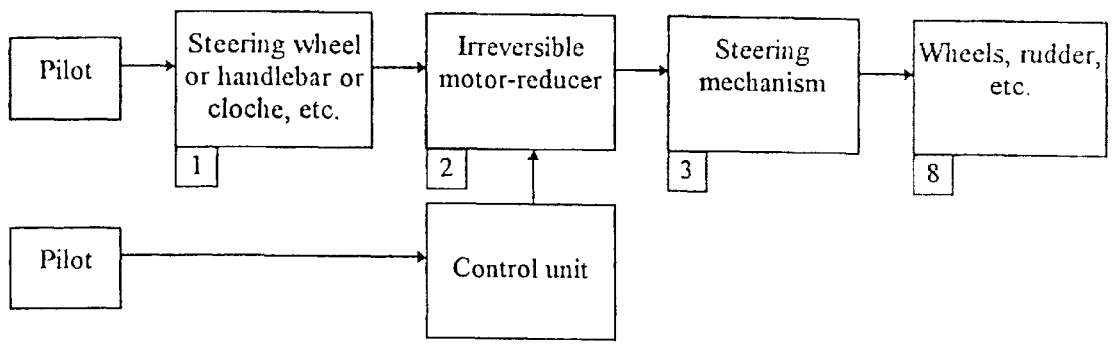
FIG. 7 shows a block diagram which illustrates the operation of the device shown in FIG. 1, assuming that the pilot directly controls the motorized device through a control unit.

Referring to FIG. 1, the subject-matter of the present invention includes a motorized device (2), which connects the steering control device (1), in the form of a steering-wheel, to the steering device (3), in the form of a steering-box, said motorized device (2) being of the irreversible motor-reducer type, i.e. such that the steering action exerted by the pilot is directly transmitted to the steering-box (3) when the motorized device (2) is inactive. The motorized device (2) can be activated by the pilot, e.g. through push-buttons located on the steering-wheel (1) or on the vehicle's frame. This simple operation of the system, of the open-loop type, is described in the corresponding block diagram of FIG. 7. When the motorized device (2) is activated through the control unit, it produces a movement, e.g. a rotation, through which it acts on the steering device (3), while the pilot exerts a simultaneous reaction on the steering-wheel (1). In this way, the steerings or the turns with small turning radius—e.g. frequent in parking manouvres or city driving—can be achieved through small movements of the control device (1), thus achieving the above-mentioned advantages.

Figure 2:
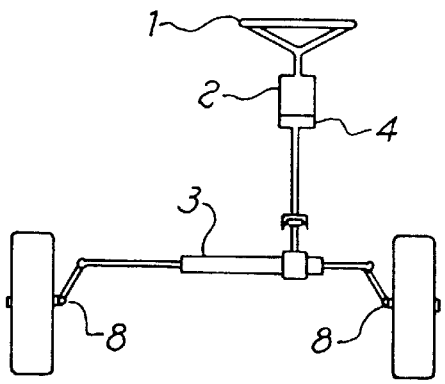
FIG. 2 schematically shows a second embodiment similar to the embodiment of FIG. 1, wherein the motorized device is provided with a locking device suitable, in pre-established situations, to make mutually integral the two parts of the motorized device respectively coupled to the control device and the steering device.
Figure 3:
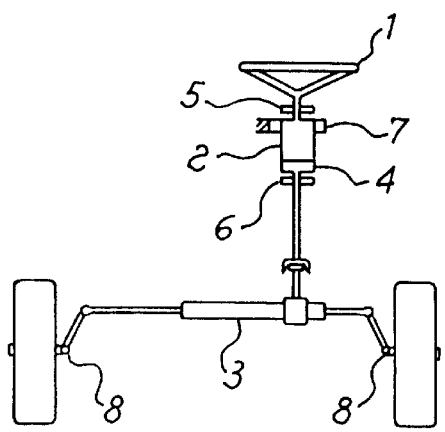
FIG. 3 schematically shows a third embodiment similar to the embodiment of FIG. 2, provided with a sensor of the angular position of the steering-wheel, a sensor of the angular position of the wheels and a locking device suitable to prevent the movement of the control device.
Figure 4:
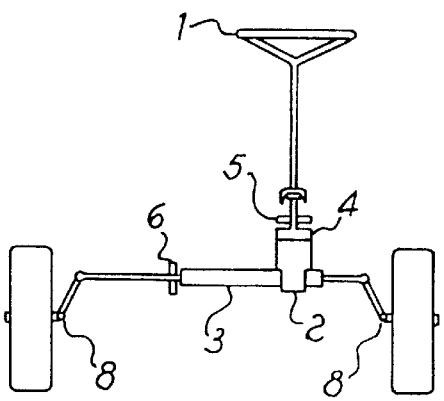
FIG. 4 schematically shows a fourth embodiment, wherein the motorized device is placed inside the steering-box.

In FIG. 2 there is shown an embodiment of the present invention which is similar to the embodiment of FIG. 1, being different therefrom in that the motorized device (2), which is assumed reversible, is provided with a locking device (4) suitable to make integral the inlet and outlet of the motorized device (2), so that in particular situations—e.g. steering with small angles of rotation of the control device (1), or in case of failure of the motorized device (2)—the steering can be achieved by direct action of the pilot as it usually occurs in a conventional steering system.

Figure 8:
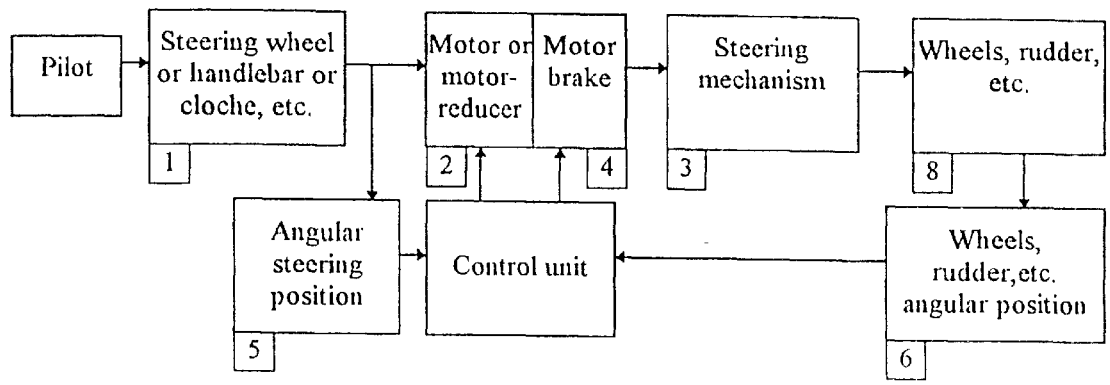
FIG. 8 shows a block diagram which illustrates the operation of the devices shown in FIGS. 3 to 6, assuming that the motorized device is controlled by a control unit according to the value of the quantities detected by the position sensors.
Figure 9:
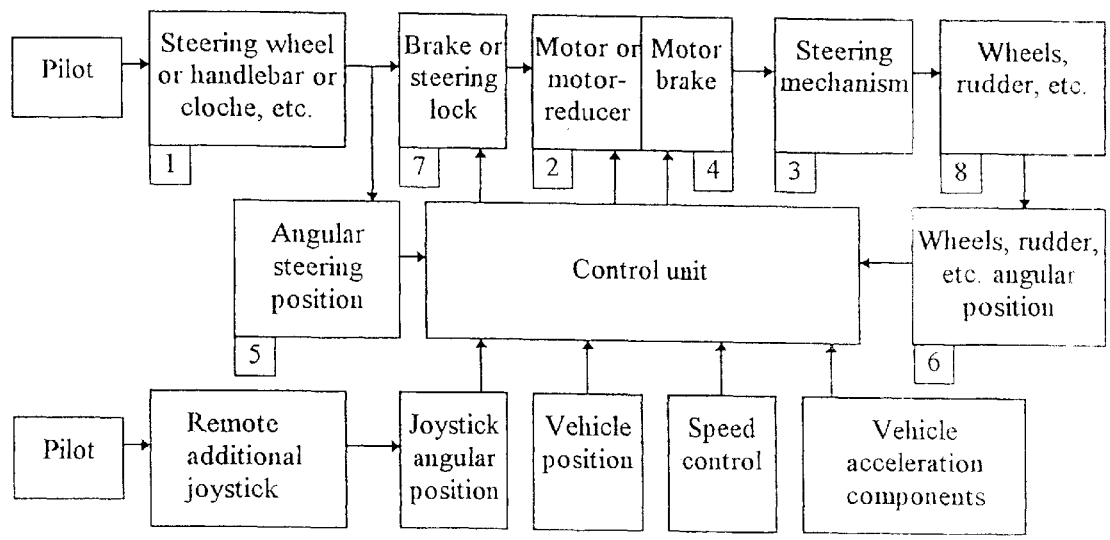
FIG. 9 shows a block diagram similar to the preceding one, assuming that the motorized device is controlled by a control unit according to the value of the quantities detected by the position sensors and by other sensors. The diagram also includes the possibility that the steering control be made remote by transferring it to an additional joystick, mechanically separate from the kinematic chain which links the control device to the steering device.

In FIGS. 3 to 6, and in the corresponding diagrams of FIGS. 8 and 9, there are shown embodiments of the present invention which are similar to the preceding ones but also include at least one position sensor (5) placed upstream and possibly at least one position sensor (6) placed downstream from the motorized device (2). For example, in a particular and non-limiting way of operation of the invention generally disclosed in the block diagram of FIG. 8, the motorized device (2) could be activated only upon exceeding of a pre-established angle of rotation of the steering-wheel detected by sensor (5), or of a pre-established velocity of rotation, or of both, according to pre-established modes. Therefore, the control unit can be programmed with different laws for gearing down and/or up the rotations of the steering-wheel, e.g. a square law, an exponential law, etc. The effect of the motorized device (2) on the steering device (3) will be more or less high according to the selected law and the amount of rotation, even allowing the pilot to drive without ever moving the hands on the steering-wheel.

In another application of the subject-matter of the present invention, the steering control unit could limit the pre-set steering amplification ratio according to signals coming from sensors of position, speed, acceleration, etc. (FIG. 9), i.e. according to the specific driving conditions. This is particularly useful in the case of a pilot's action not adequate to the road holding conditions of the vehicle, whereby this system can act as an additional safety device to prevent about-faces, etc.

In another embodiment, the system of the present invention includes a locking device (7) suitable to prevent the movement of the control device (1), thus allowing the remote steering control. This function, generally disclosed in the lower row of the block diagram of FIG. 9, is particularly useful for those which must simultaneously drive and operate machines. Furthermore, it makes driving possible to people with limb functionality insufficient for using a mechanical steering. The locking device (7) is required to provide the opposing reaction on the steering-wheel when the pilot acts directly on the remote control (e.g. joystick).

Figure 5:
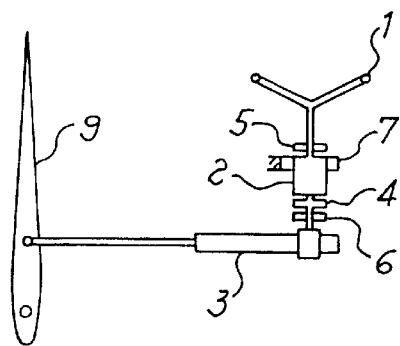
FIG. 5 schematically shows a fifth embodiment similar to the third embodiment of FIG. 3, wherein the control device is in the form of a handlebar and the steering device transmits the movement to a control rudder.
Figure 6:
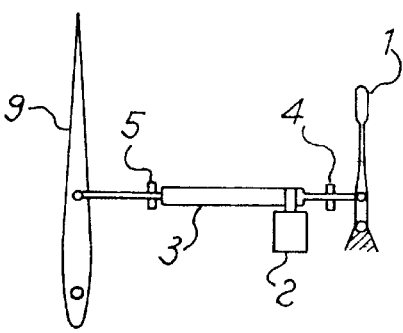
FIG. 6 schematically shows a sixth embodiment similar to the preceding embodiment of FIG. 4, wherein the control device is in the form of a cloche and the motorized device is in the form of a linear actuator which transmits the movement to a control rudder.

In FIGS. 5 and 6 the system of the present invention is shown in an embodiment suitable to move a control rudder. In FIG. 5, the pilot controls the direction through a handlebar (1) keyed upstream from the motorized device (2); in FIG. 6 the handlebar is replaced by a cloche (1) acting with a favourable lever ratio on the motorized device (2) which is in the form of a linear actuator, and which provides the amplification of the movement of the mechanism placed between the cloche (1) and the control rudder (9).

Figure 10:
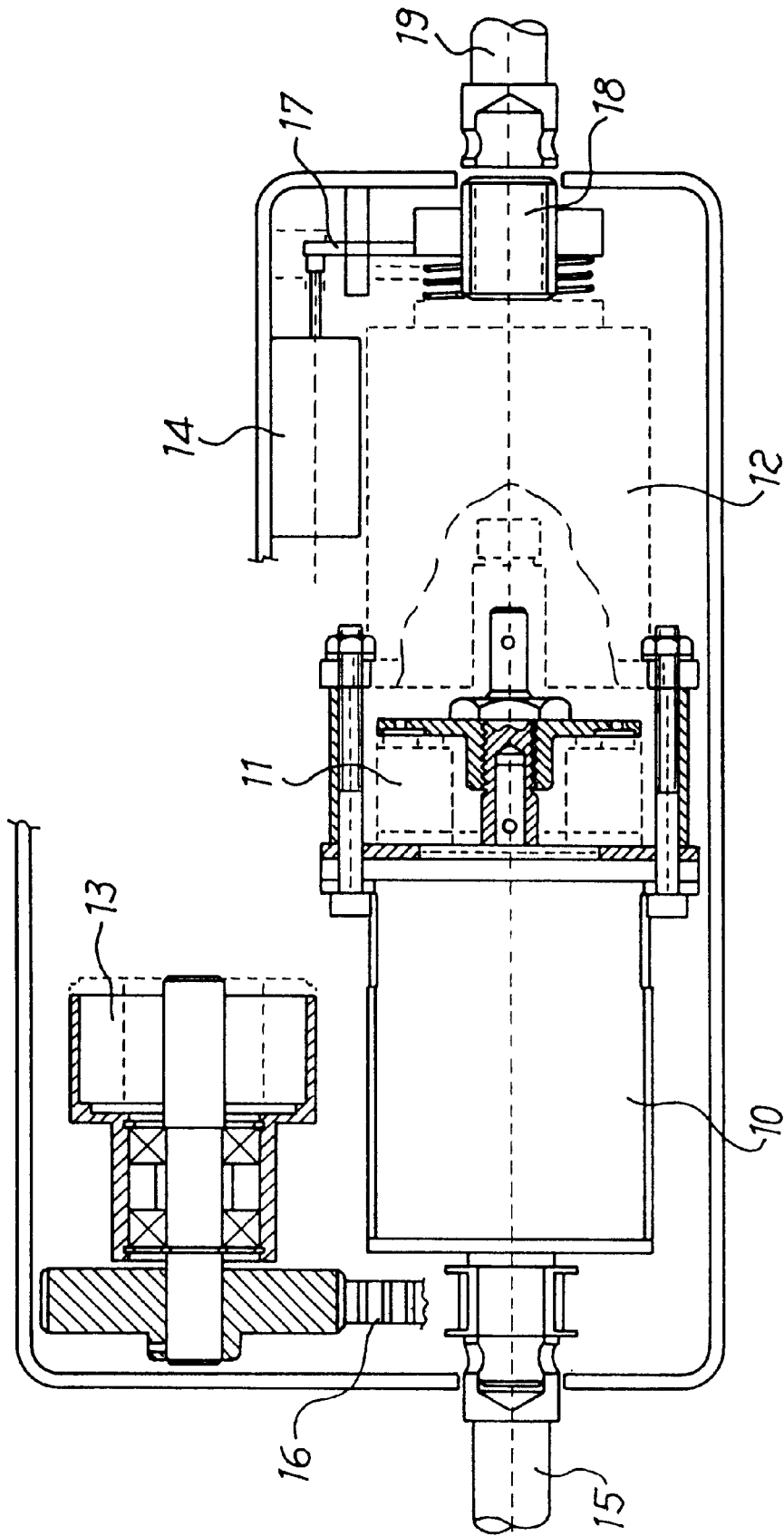
FIG. 10 is a schematic longitudinal sectional view of a practical embodiment of a reversible motorized device.

In FIG. 10, there is shown a practical embodiment of the motorized device (2) which includes a stepper motor (10), an electromagnetic brake (11) and an epicyclical reversible reduction gear (12). The position of the steering-wheel is detected by a first position sensor (13) located at the upstream end of the motorized device (2), while the position of the steering device is detected by a second position sensor (14) located at the downstream end. The first sensor (13) is in the form of a rotating resolver connected to the shaft (15) of the steering-wheel through a cog belt (16). A reduced bulkiness is obtained through the second sensor (14), which is a linear transducer activated by a threaded flange (17) moved by a screw (18) secured onto the shaft (19) to the steering device.

The electromagnetic brake (11) is connected so that in the absence of the power supply, i.e. inactive device or failure, it makes motor (10) integral with reduction gear (12) thus restoring the direct connection between the steering-wheel and the steering device. The use of a stepper motor is desirable for its high torque features useful for small movements of high-inertia systems.

In case of use of a remote control (e.g. joystick), the steering-wheel is locked and the joystick is directly connected to the inlet of sensor (13) which will therefore detect the joystick position.

All these examples have the common feature that the subject-matter of the present invention changes only the amplitude of the movement transmitted by the control device (1) to the steering device (3), with the main object of achieving the steering through a pilot's movement of smaller amplitude, and consequently less work with respect to what would otherwise be required in the absence of said device.

It is pointed out that these examples have been illustrated with the only aim of describing said operating principle of the motor-driven steering system which is the subject-matter of the present invention, regardless of the embodiment of the steering control device (1), of the motorized device (2), of the steering device (3) and of the devices (8) or (9) which give the direction.

In fact, it can be easily understood that said motor-driven steering system can be accomplished with motors or rotating/linear actuators operating on any kind of energy: electric, hydraulic, pneumatic, thermochemical, etc., or it can be accomplished with steering mechanisms different from the conventional steering-box of a motor vehicle, or with directing devices different from the wheels of a motor vehicle, or the control rudder of a boat or aircraft, such as, for example, runners, or devices for controlling an helicopter rotor, etc.

What is claimed is:

1. A motor-driven system for steering a vehicle, including a steering control device (1) and a steering device (3) connected through a motorized device (2) for changing the ratio of the steering angle transmitted between the steering control device (1) and the steering device (3) and to restore a direct connection therebetween in case of failure of the system, the operation of said motorized device (2) being controlled by a control unit, the motorized device (2) being activated only in response to the movement of the steering control device (1) and functioning in a manner which requires the operator to exert an opposite equivalent reaction on the steering control device (1).

2. A motor-driven system for steering a vehicle, according to claim 1, wherein the motorized device includes an irreversible motor-reducer.

3. A motor-driven system for steering a vehicle, according to claim 1, characterized in that the motorized device (2) includes an electromagnetic brake (11) connected so as to lock the inlet of said motorized device (2) to the outlet thereof in case of failure.

4. A motor-driven system for steering a vehicle, according to claim 1, characterized in that the motorized device (2) is controlled by a closed-loop control system wherein the control unit is operatively connected to sensors (5) of the position of the steering control device (1) and/or to sensors (6) of the position of the steering device (3).

5. A motor-driven system for steering a vehicle, according to claim 4, characterized in that the control unit is further operatively connected to sensors for detecting other parameters such as the vehicle speed, the vehicle acceleration components, etc.

6. A motor-driven system for steering a vehicle, according to claim 1, characterized in that the motorized device (2) is placed inside the steering device (3).

7. A motor-driven system for steering a vehicle, according to claim 1, characterized in that it further includes a locking device (7) suitable to prevent the movement of the steering control device (1) and to provide the relevant reaction thereon, as well as a remote control device operatively connected to the control unit and suitable to act as a remote steering control device.

8. A motor-driven system for steering a vehicle, according to claim 3, characterized in that the motorized device (2) includes an electric motor (10), an electromagnetic brake (11), an epicyclical reversible reduction gear (12), a first position sensor (13) located at the upstream end and a second position sensor (14) located at the downstream end.

9. A motor-driven system for steering a vehicle, according to claim 8, characterized in that said first and second sensors (13, 14) are rotating resolvers respectively connected to the shaft (15) of the steering-wheel and to the shaft (19) of the steering device through cog belts (16).

10. A motor-driven system for steering a vehicle, according to claim 8, characterized in that said first and second sensors (13, 14) are linear transducers respectively connected to the shaft (15) of the steering-wheel and to the shaft (19) of the steering device, and activated by a threaded flange (17) moved by a screw (18) secured onto said shafts (15, 19).

* * * * *